(12) United States Patent  (10) Patent No.: US 8,964,137 B2
Kashiwagi et al.  (45) Date of Patent: Feb. 24, 2015

(54) IMAGE DISPLAY DEVICE

(71) Applicants: Masako Kashiwagi, Kanagawa-ken (JP); Shinichi Uehara, Tokyo (JP); Ayako Takagi, Kanagawa-ken (JP); Masahiro Baba, Kanagawa-ken (JP)

(72) Inventors: Masako Kashiwagi, Kanagawa-ken (JP); Shinichi Uehara, Tokyo (JP); Ayako Takagi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 107 days.

(21) Appl. No.: 13/719,421

(22) Filed: Dec. 19, 2012

(65) Prior Publication Data

US 2013/0229585 A1  Sep. 5, 2013

(30) Foreign Application Priority Data

Mar. 5, 2012 (JP) ................. 2012-048451

(51) Int. Cl.
  G02F 1/1335 (2006.01)
  G02B 27/26 (2006.01)
  H04N 13/04 (2006.01)

(52) U.S. Cl.
  CPC ............. *G02F 1/1335* (2013.01); *G02B 27/26* (2013.01); *H04N 13/0452* (2013.01); *H04N 13/042* (2013.01); *H04N 2213/001* (2013.01)
  USPC ......................................... 349/15

(58) Field of Classification Search
  USPC ......................................... 349/15
  See application file for complete search history.

(56) References Cited

U.S. PATENT DOCUMENTS 7,404,642 B2 * 7/2008 Shestak et al. ............ 353/7
2007/0115230 A1 5/2007 Tajiri et al.
2008/0068543 A1 3/2008 Mitsui et al.
2010/0238277 A1 9/2010 Takahashi et al.
2010/0259697 A1 10/2010 Sakamoto et al.
2011/0199548 A1 8/2011 Takama (Continued)

FOREIGN PATENT DOCUMENTS

CN 101477278 7/2009
CN 101833170 9/2010
CN 201909923 7/2011

(Continued)

OTHER PUBLICATIONS

Notification of Comments issued by the Korean Patent Office on Jan. 29, 2014, for Korean Patent Application No. 10-2012-154793, and English-language translation thereof.

(Continued)

*Primary Examiner* — Timothy L Rude

(74) *Attorney, Agent, or Firm* — Finnegan, Henderson, Farabow, Garrett & Dunner, L.L.P.

(57) ABSTRACT

According to one embodiment, an image display device includes an image display unit and a liquid crystal optical apparatus stacked with image display unit. The image display unit emits image light having a polarizing axis. The liquid crystal optical apparatus includes first and second substrate units and a liquid crystal layer. The first substrate unit includes a first substrate and first electrodes extending along a first direction. An angle between the polarizing axis and a second direction perpendicular to the first direction is greater than 0 degrees and less than 90 degrees. The liquid crystal layer is provided between the first and second substrate units. An angle between a long-axis direction of the liquid crystal and the polarizing axis is greater than 0 degrees and less than the angle between the polarizing axis and the second direction.

20 Claims, 4 Drawing Sheets

(56) References Cited

U.S. PATENT DOCUMENTS

2011/0292306 A1    12/2011    Kim et al.
2012/0229442 A1*    9/2012    Inoue ........................... 345/212

FOREIGN PATENT DOCUMENTS

| JP | 9-15639 | 1/1997 |
| JP | 3940725 | 4/2007 |
| JP | 2008-76501 | 4/2008 |
| JP | 2010-211036 | 9/2010 |
| JP | 2010-249954 | 11/2010 |
| JP | 2011-164527 | 8/2011 |

OTHER PUBLICATIONS

Notification of Reason(s) for Refusal issued by the Japanese Patent Office on Apr. 22, 2014, for Japanese Patent Application No. 2012-048451, and English-language translation thereof.

Notification of the First Office Action issued by the State Intellectual Property Office of the People's Republic of China on Dec. 5, 2014, for Chinese Patent Application No. 201210583808.8,' and English-language translation thereof.

* cited by examiner

IMAGE DISPLAY DEVICE

CROSS-REFERENCE TO RELATED APPLICATIONS

This application is based upon and claims the benefit of priority from the prior Japanese Patent Application No. 2012-048451, filed on Mar. 5, 2012; the entire contents of which are incorporated herein by reference.

FIELD

Embodiments described herein relate generally to an image display.

BACKGROUND

A liquid crystal optical apparatus is known in which the distribution of the refractive index is changed according to the application of a voltage by utilizing the birefringence of liquid crystal molecules. There exists a stereoscopic image display device that combines an image display unit with such a liquid crystal optical apparatus.

By changing the distribution of the refractive index of the liquid crystal optical apparatus, the stereoscopic image display device switches between a state in which the image displayed on the image display unit is incident on the eyes of the human viewer as displayed on the image display unit and a state in which the image displayed on the image display unit is incident on the eyes of the human viewer as multiple parallax images. Thereby, a high definition two-dimensional image display operation and a three-dimensional image display operation are realized, where the three-dimensional image display operation includes stereoscopic viewing with the naked eyes due to the multiple parallax images. It is desirable to realize good optical characteristics of the liquid crystal optical apparatus used in the stereoscopic image display device.

DETAILED DESCRIPTION

Figure 1A:
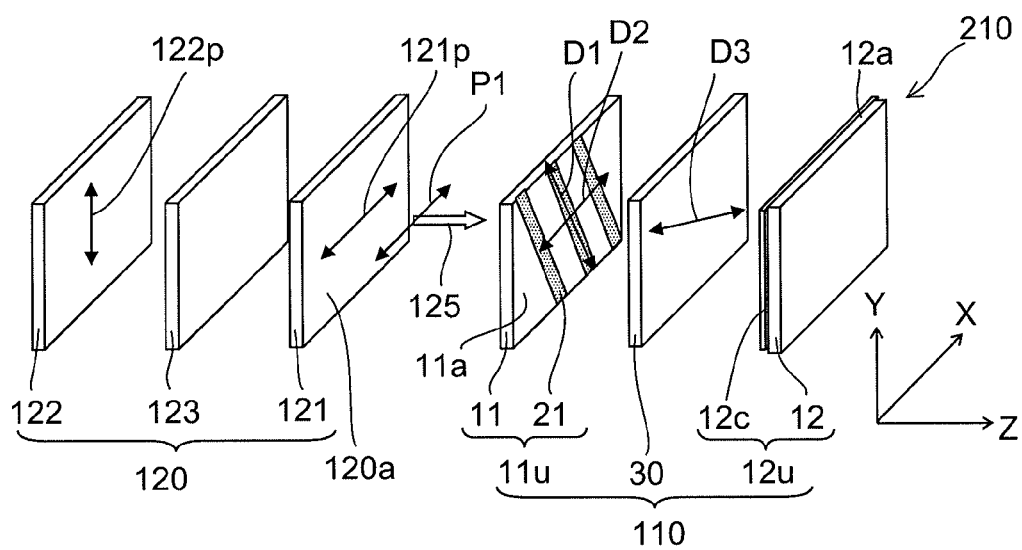
FIG. 1A and FIG. 1B are schematic views illustrating the configuration of an image display device according to a first embodiment.

According to one embodiment, an image display device includes an image display unit and a liquid crystal optical apparatus. The image display unit has a display surface. The image display unit is configured to emit image light. The image light is polarized light having a polarizing axis parallel to the display surface. The liquid crystal optical apparatus is stacked with the display surface. The liquid crystal optical apparatus includes a first substrate unit, a second substrate unit, and a liquid crystal layer. The first substrate unit includes a first substrate having a first major surface parallel to the display surface, and a plurality of first electrodes provided on the first major surface to extend along a first direction. The first electrodes are arranged in a direction non-parallel to the first direction. An angle between the polarizing axis and a second direction parallel to the first major surface and perpendicular to the first direction is greater than 0 degrees and less than 90 degrees. The second substrate unit includes a second substrate having a second major surface opposing the first major surface, and an opposing electrode provided on the second major surface to oppose the first electrodes. The liquid crystal layer is provided between the first substrate unit and the second substrate unit. The liquid crystal layer includes liquid crystal molecules. An angle between a third direction and the polarizing axis is greater than 0 degrees and less than the angle between the polarizing axis and the second direction. The third direction is a long-axis direction of the liquid crystal molecules projected onto the first major surface.

Embodiments will now be described with reference to the drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

Figure 1B:
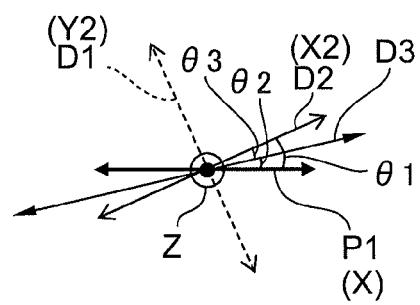

FIG. 1A and FIG. 1B are schematic views illustrating the configuration of an image display device according to a first embodiment.

FIG. 1A is a schematic perspective view illustrating the configuration of the image display device 210. FIG. 1B is a schematic view illustrating the optical axes of the image display device 210.

Figure 2:
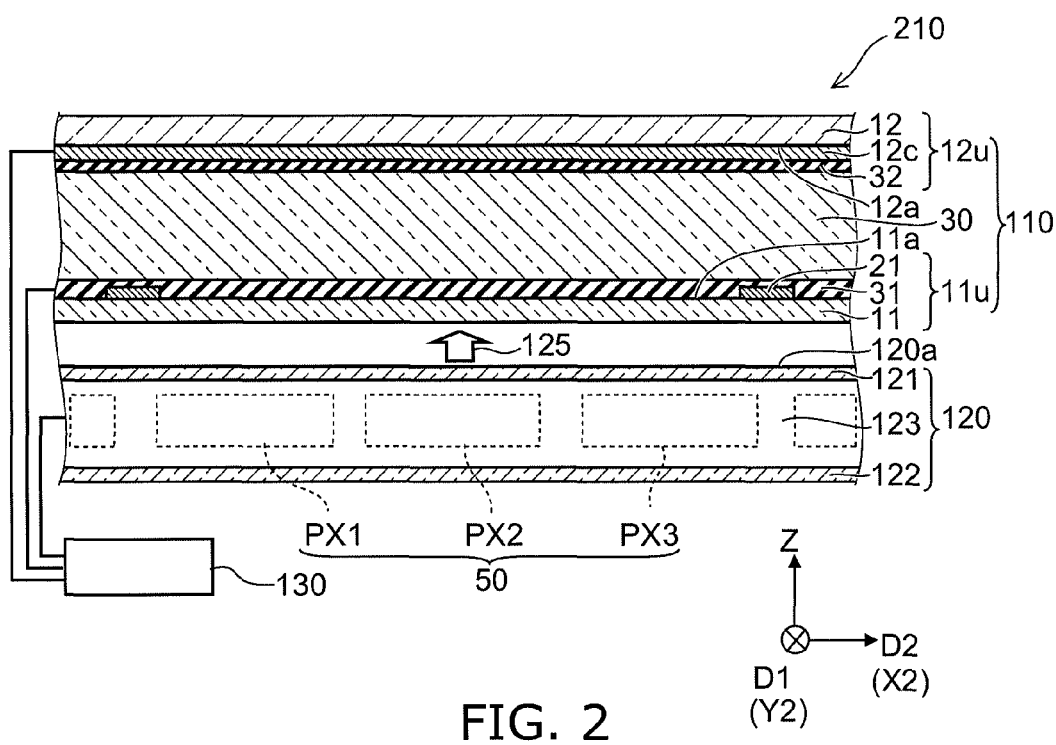
FIG. 2 is a schematic cross-sectional view illustrating the configuration of the image display device according to the first embodiment.

FIG. 2 is a schematic cross-sectional view illustrating the configuration of the image display device according to the first embodiment.

As illustrated in FIG. 1A and FIG. 2, the image display device 210 includes a liquid crystal optical apparatus 110 and an image display unit 120. As illustrated in FIG. 2, the image display device 210 may further include a drive unit 130.

As illustrated in FIG. 1A, the image display unit 120 has a display surface 120a. The liquid crystal optical apparatus 110 is stacked with the display surface 120a of the image display unit 120.

In the specification of the application, the state of being stacked includes not only the state of being directly overlaid but also the state of being overlaid with another component inserted therebetween.

The image display unit 120 emits image light 125. The image light 125 is polarized light. The polarized light has a polarizing axis P1 that is parallel to the display surface 120a.

A direction perpendicular to the display surface 120a is taken as a Z-axis direction. One direction perpendicular to the Z-axis direction is taken as an X-axis direction. A direction perpendicular to the Z-axis direction and the X-axis direction is taken as a Y-axis direction.

For example, the polarizing axis P1 is taken to be parallel to the X-axis direction.

The image display unit 120 may include, for example, a liquid crystal display device. For example, the image display unit 120 includes a first polarizing layer 121, a second polarizing layer 122, and a display liquid crystal layer 123. The display liquid crystal layer 123 is provided between the first polarizing layer 121 and the second polarizing layer 122. The first polarizing layer 121 and the second polarizing layer 122 may include, for example, polarizers, polarizing films, polarizing filters, etc. The first polarizing layer 121 has a first transmission axis 121p. The first transmission axis 121p is an axis perpendicular to the absorption axis of the first polarizing layer 121 (the extension direction of the first polarizing layer 121). The second polarizing layer 122 includes a second transmission axis 122p. The second transmission axis 122p is an axis perpendicular to the absorption axis of the second polarizing layer 122 (the extension direction of the second polarizing layer 122).

In this example, the first polarizing layer 121 is disposed between the display liquid crystal layer 123 and the liquid crystal optical apparatus 110. The polarizing axis P1 of the image light 125 emitted from the image display unit 120 is substantially parallel to the first transmission axis 121p of the first polarizing layer 121.

For example, the image light 125 substantially is linearly polarized light. The component of the vibration plane (the vibration plane of the electric field) of the image light 125 along the polarizing axis P1 is greater than the component of the vibration plane (the vibration plane of the electric field) of the image light 125 along an axis orthogonal to the polarizing axis P1.

The configuration of the image display unit 120 is arbitrary. Any configuration such as, for example, a VA mode, a TN mode, an IPS mode, etc., is applicable to the display liquid crystal layer 123. A phase difference layer (a phase difference plate) may be provided in at least one selected from the region between the first polarizing layer 121 and the display liquid crystal layer 123 and the region between the second polarizing layer 122 and the display liquid crystal layer 123.

The liquid crystal optical apparatus 110 includes a first substrate unit 11u, a second substrate unit 12u, and a liquid crystal layer 30.

The first substrate unit 11u includes a first substrate 11 and multiple first electrodes 21. The first substrate 11 has a first major surface 11a. The first major surface 11a is parallel to the display surface 120a.

The multiple first electrodes 21 are provided on the first major surface 11a. Each of the multiple first electrodes 21 extends along a first direction D1 (e.g., a Y2-axis direction). The multiple first electrodes 21 are arranged along a direction non-parallel to the first direction D1. A second direction D2 (e.g., an X2-axis direction) is taken to be a direction parallel to the first major surface 11a and perpendicular to the first direction D1. For example, the multiple first electrodes 21 are arranged along the second direction D2.

The first direction D1 is neither parallel nor perpendicular to the polarizing axis P1. The second direction D2 is neither parallel nor perpendicular to the polarizing axis P1. The angle between the polarizing axis P1 and the first direction D1 is greater than 0 degrees and less than 90 degrees. The angle between the polarizing axis P1 and the second direction D2 (a first angle $\theta 1$) is greater than 0 degrees and less than 90 degrees. The first angle $\theta 1$ is the smaller angle that is formed between the polarizing axis P1 and the second direction D2.

The second substrate unit 12u includes a second substrate 12 and an opposing electrode 12c. The second substrate 12 has a second major surface 12a. The second major surface 12a opposes the first major surface 11a. The opposing electrode 12c is provided on the second major surface 12a. The opposing electrode 12c opposes each of the multiple first electrodes 21.

In the specification of the application, the state of being opposed includes not only the state of directly facing each other but also the state of facing each other with another component inserted therebetween.

The liquid crystal layer 30 is provided between the first substrate unit 11u and the second substrate unit 12u. The long-axis direction (the direction of the director) of the liquid crystal molecules of the liquid crystal layer 30 when projected onto the first major surface 11a is taken as a third direction D3. The third direction D3 corresponds to the orientation direction of the liquid crystal. The angle (a second angle $\theta 2$) between the third direction D3 and the polarizing axis P1 is greater than 0 degrees and less than the first angle $\theta 1$. In other words, the third direction D3 is non-parallel to the second direction D2.

In the specification of the application, the angle between a first axis (a first direction) and a second axis (a second direction) is the angle that is formed between the first axis (the first direction) and the second axis (the second direction) and is not more than 90 degrees. The angle is a positive value and is the absolute value of the angle of rotation from the first axis to the second axis or the absolute value of the angle of rotation from the second axis to the first axis. A rotation of the second axis with respect to the first axis for one angle between the first axis and the second axis includes the rotation in the positive direction and the rotation in the negative direction. Either of the two rotation directions for the one angle between the first axis and the second axis may be employed.

As illustrated in FIG. 1B, as described above, the angle (the first angle $\theta 1$) between the polarizing axis P1 and the second direction D2 is greater than 0 degrees and less than 90 degrees. The angle (the second angle $\theta 2$) between the polarizing axis P1 and the third direction D3 is greater than 0 degrees and less than the first angle $\theta 1$.

In this example, the angle (a third angle $\theta 3$) between the third direction D3 and the second direction D2 is greater than 0 degrees and less than the angle (the first angle $\theta 1$) between the polarizing axis P1 and the second direction D2. In other words, the third direction D3 is positioned inside the smaller angle that is formed between the polarizing axis P1 and the second direction D2.

For example, the liquid crystal layer 30 includes a nematic liquid crystal.

The dielectric anisotropy of the liquid crystal included in the liquid crystal layer 30 may be positive. The state in which a voltage is not applied to the liquid crystal layer 30 (or, in the case where the liquid crystal layer 30 has a threshold voltage, the state in which a voltage that is not more than the threshold voltage is applied) is taken as a non-activated state. The state in which a voltage (a voltage greater than the threshold voltage) is applied to the liquid crystal layer 30 is taken as an activated state. For example, in the non-activated state, the liquid crystal layer 30 has a substantially horizontal alignment. In this state, the third direction D3 which is the long-axis direction of the liquid crystal molecules projected onto the first major surface 11a corresponds to the orientation direction. In the case where the dielectric anisotropy is positive, the pretilt angle of the liquid crystal (the angle between the director and the major surface of the substrate) in the non-activated state is, for example, not less than 0 degrees and not more than 30 degrees. For example, the alignment of the liquid crystal substantially is a horizontal alignment or a HAN (hybrid aligned nematic) alignment.

For example, the dielectric anisotropy of the liquid crystal included in the liquid crystal layer 30 may be negative. For example, in the activated state in which the voltage (the voltage greater than the threshold voltage) is applied to the liquid crystal layer 30, the long-axis direction of the liquid crystal molecules of the liquid crystal layer 30 has a component parallel to the first major surface 11a. In this state, the third direction D3 which is the long-axis direction of the liquid crystal molecules projected onto the first major surface 11a corresponds to the orientation direction. In the case where the dielectric anisotropy is negative, the pretilt angle of the liquid crystal in the non-activated state is, for example, not less than 60 degrees and not more than 90 degrees. For example, the alignment of the liquid crystal substantially is a vertical alignment or a HAN alignment.

For example, in the case where the liquid crystal alignment of the liquid crystal layer 30 is formed by rubbing, the third direction D3 is substantially parallel to the rubbing direction. The rubbing direction can be determined by observing the anisotropy of the nonuniformity (e.g., the rubbing scratches, etc.) of the alignment of the liquid crystal layer 30 that occurs when a voltage (particularly a direct-current voltage) is applied to the liquid crystal layer 30. The liquid crystal alignment of the liquid crystal layer 30 may be formed by a photo-alignment method, etc., and may be formed by any method.

In this example, the first substrate unit 11u further includes a first alignment film 31. The first alignment film 31 also is provided between the first substrate 11 and the liquid crystal layer 30 and between the first electrode 21 and the liquid crystal layer 30. The second substrate unit 12u further includes a second alignment film 32. The second alignment film 32 is provided between the second substrate 12 and the liquid crystal layer 30 and between the opposing electrode 12c and the liquid crystal layer 30. The initial alignment of the liquid crystal layer 30 is formed by performing a prescribed processing of these alignment films.

The first substrate 11, the second substrate 12, the first electrodes 21, and the opposing electrode 12c may include, for example, a transparent material. The image light 125 emitted from the image display unit 120 passes through the first substrate 11, the second substrate 12, the first electrodes 21, and the opposing electrode 12c.

The first substrate 11 and the second substrate 12 may include, for example, glass, a resin, etc. The first electrodes 21 and the opposing electrode 12c may include, for example, an oxide including at least one element selected from the group consisting of In, Sn, Zn, and Ti. The first electrodes 21 and the opposing electrode 12c may include, for example, ITO. For example, the first electrodes 21 and the opposing electrode 12c may be at least one selected from $In_2O_3$ and $SnO_3$. For example, the first electrodes 21 and the opposing electrode 12c may be thin metal layers.

The first alignment film 31 and the second alignment film 32 may include, for example, a resin such as polyimide. For example, the film thicknesses of the first alignment film 31 and the second alignment film 32 are 200 nm (e.g., not less than 100 nm and not more than 300 nm).

For example, the liquid crystal optical apparatus 110 functions as a liquid crystal GRIN (Gradient Index) lens. The distribution of the refractive index of the liquid crystal optical apparatus 110 is changeable. In one state (a first state) of the distribution of the refractive index, the refractive index is substantially uniform in the X2-Y2 plane. In another state (a second state) of the refractive index distribution, the refractive index changes along the X2 axis. Examples of operations of the liquid crystal optical apparatus 110 are described below.

For example, the image display unit 120 includes multiple pixel groups 50 (e.g., a first pixel PX1, a second pixel PX2, a third pixel PX3, etc.). The multiple pixel groups 50 are arranged in a matrix configuration in a plane parallel to the display surface 120a. Multiple parallax images are displayed by the pixel groups 50.

The drive unit 130 is electrically connected to the liquid crystal optical apparatus 110 (the first electrodes 21 and the opposing electrode 12c). In this example, the drive unit 130 also is electrically connected to the image display unit 120. The drive unit 130 controls the operations of the liquid crystal optical apparatus 110 and the image display unit 120. For example, the drive unit 130 causes the liquid crystal optical apparatus 110 to switch between the first state and the second state. The drive unit 130 applies a voltage between the first electrode 21 and the opposing electrode 12c to change the distribution of the refractive index of the liquid crystal layer 30.

An image signal is input to the drive unit 130 by, for example, a recording medium, an external input, etc. The drive unit 130 controls the operation of the image display unit 120 based on the image signal that is input. Thereby, the image light 125 corresponding to the image signal that is input is emitted from the display surface 120a. The drive unit 130 may be included in the image display unit 120. For example, the drive unit 130 may be included in the liquid crystal optical apparatus 110. For example, the portion of the drive unit 130 relating to the driving of the liquid crystal optical apparatus 110 may be included in the liquid crystal optical apparatus 110.

In the case where a 2D display is performed, the drive unit 130 switches the liquid crystal optical apparatus 110 to the first state and causes the image display unit 120 to display an image for the 2D display. On the other hand, in the case where a 3D display is performed, the drive unit 130 switches the liquid crystal optical apparatus 110 to the second state and causes the image display unit 120 to display an image for the 3D display.

In the image display device 210, it is possible to selectively switch between the display of the two-dimensional image (hereinbelow, called the 2D display) and the display of the three-dimensional image (hereinbelow, called the 3D display) in which stereoscopic viewing with the naked eyes is possible by causing the distribution of the refractive index of the liquid crystal optical apparatus 110 to change.

Figure 3A:
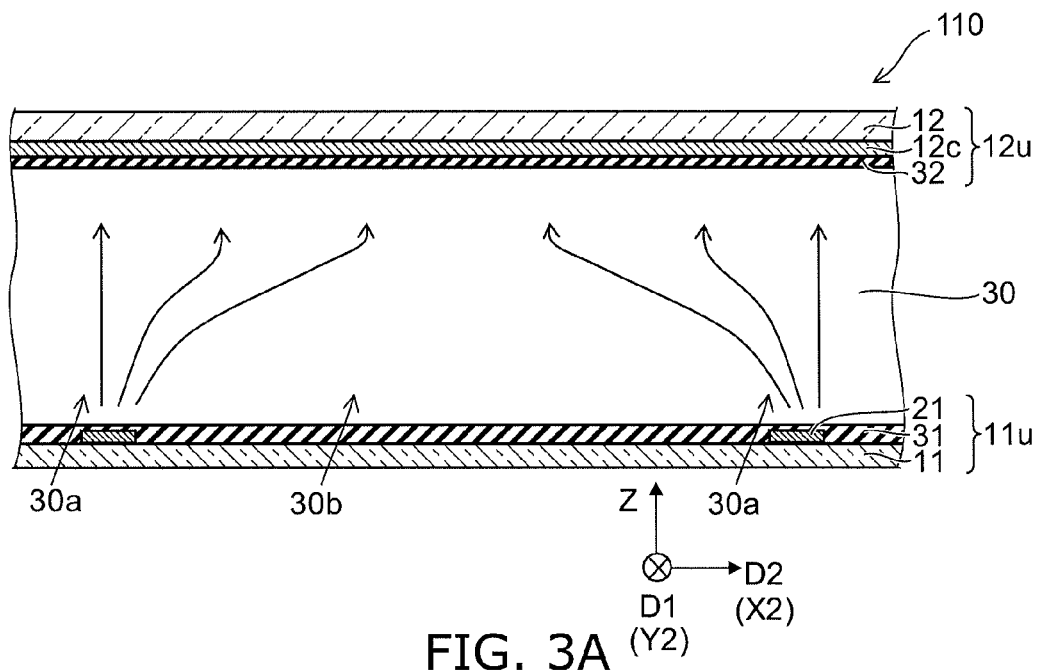
FIG. 3A and FIG. 3B are schematic cross-sectional views illustrating characteristics of the image display device according to the first embodiment.
Figure 3B:
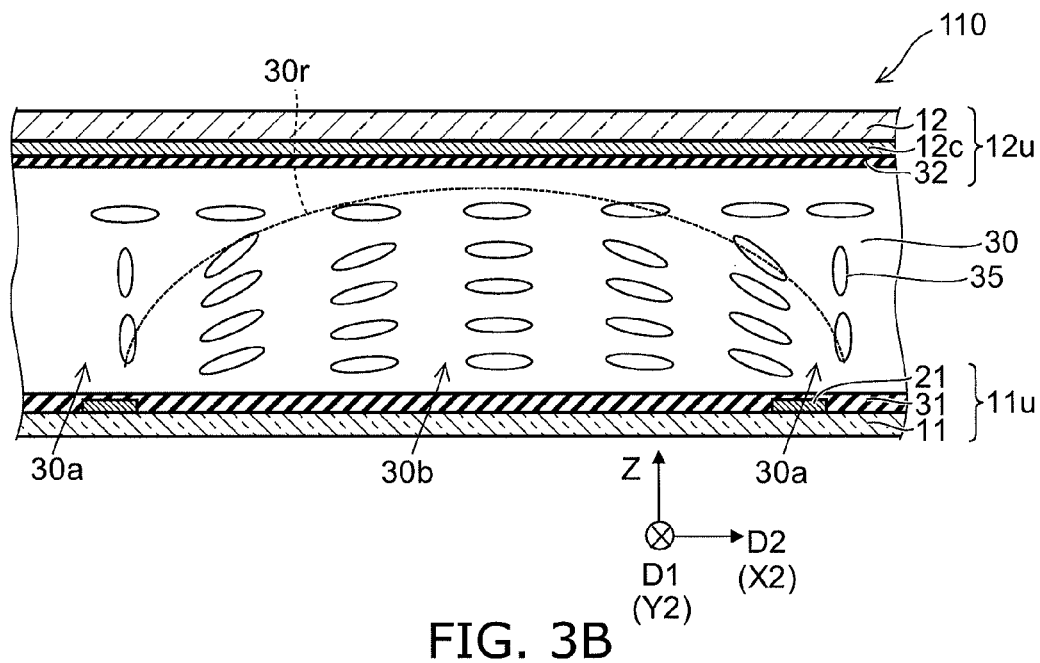

FIG. 3A and FIG. 3B are schematic cross-sectional views illustrating characteristics of the image display device according to the first embodiment.

FIG. 3A illustrates the distribution of lines of electric force EL occurring in the liquid crystal layer 30. FIG. 3B is a model-like illustration of the alignment of the liquid crystal molecules of the liquid crystal layer 30. To simplify the description hereinbelow, the case is described where the dielectric anisotropy of the liquid crystal layer 30 is positive.

As illustrated in FIG. 3A, the lines of electric force EL occur in the liquid crystal layer 30 when a voltage that is higher than the threshold voltage of the liquid crystal layer 30 is applied between the first electrodes 21 and the opposing electrode 12c. For example, the lines of electric force EL have a distribution that is centered on the first electrode 21 and has line symmetry with the first direction D1 as an axis of symmetry. As illustrated in FIG. 2B, the alignment of the liquid crystal layer 30 is determined by the elastic energy and the inductive energy due to the voltage applied to the liquid crystal layer 30.

In the case where the dielectric anisotropy of the liquid crystal layer 30 is positive as illustrated in FIG. 3B, liquid crystal molecules 35 proximal to the first electrode 21 are substantially aligned with the lines of electric force EL. The tilt angle of the liquid crystal molecules 35 is large in a first portion 30a of the liquid crystal layer 30 where the first electrode 21 opposes the opposing electrode 12c. On the other hand, the liquid crystal molecules 35 have the horizontal alignment in a second portion 30b of the liquid crystal layer 30 proximal to the center between two mutually-adjacent first electrodes 21. The angle (the tilt angle) of the liquid crystal molecules 35 changes continuously in the portion between the first portion 30a and the second portion 30b.

The liquid crystal molecules 35 have birefringence. The refractive index in the long-axis direction of the liquid crystal molecules 35 with respect to the polarized light is higher than the refractive index in the short-axis direction of the liquid crystal molecules 35. The refractive index of the liquid crystal layer 30 is high at the second portion 30b and gradually decreases toward the first portion 30a as the angle of the liquid crystal molecules 35 changes. Thereby, a refractive index distribution 30r having a convex lens configuration is formed.

In the second state of the liquid crystal optical apparatus 110, a lens having a lenticular configuration is formed. In this lens, a state is formed in which cylindrical lenses extending along the first direction D1 (the Y2-axis direction) are multiply arranged in the second direction D2 (the X2-axis direction).

The multiple parallax images formed by the pixel groups 50 of the image display unit 120 are caused to be selectively incident on the right eye or the left eye of the human viewer by the lens having the lenticular configuration formed by the liquid crystal optical apparatus 110. Thereby, the 3D image is perceived in the second state.

In the case where the image display unit 120 performs the 2D display, the liquid crystal optical apparatus 110 is switched to the first state in which the refractive index distribution is uniform. The human viewer perceives a high definition 2D image.

Thus, the image display device 210 is switched between the 2D display and the 3D display by changing the refractive index distribution of the liquid crystal layer 30 by the voltage applied to the liquid crystal layer 30 of the liquid crystal optical apparatus 110.

In the second state of the liquid crystal optical apparatus 110, a high voltage is applied between the first electrodes 21 and the opposing electrode 12c. In such a case, the tilt direction of the liquid crystal proximal to the first electrode 21 inverts because the long-axis direction of the liquid crystal aligns with the lines of electric force EL. In other words, reverse tilt occurs. Further, a twist alignment (a rotation of the director of the liquid crystal in the X2-Y2 plane) occurs to relax the elastic energy of the reverse tilt. Disclinations occur; and the optical characteristics of the liquid crystal optical apparatus 110 degrade.

Experiments of the disclinations were performed. As a result, it was found that the occurrence of the disclinations can be suppressed by offsetting the direction of the liquid crystal alignment (the third direction D3) with respect to the second direction D2 that is perpendicular to the extension direction of the first electrodes 21.

In this embodiment, the third direction D3 which is the orientation direction of the liquid crystal is tilted with respect to the second direction D2. In other words, the direction of the liquid crystal alignment (the third direction D3) is offset with respect to the second direction D2 which is perpendicular to the extension direction of the first electrodes 21. Thereby, the long-axis direction of the liquid crystal molecules proximal to the first electrode 21 is tilted with respect to the second direction D2. Thereby, an electric field having a component that is tilted in the X2-Y2 plane with respect to the long-axis direction of the liquid crystal molecules is applied to the liquid crystal molecules. In other words, the orientation direction of the liquid crystal is set such that a twisted electric field is applied. Thereby, the occurrence of the reverse twist is suppressed.

On the other hand, the change of the effective refractive index of the liquid crystal layer 30 with respect to the polarized light increases based on the change of the alignment of the liquid crystal when the polarizing axis P1 of the polarized light is aligned with the long-axis direction of the liquid crystal. In other words, the lens effect of the liquid crystal optical apparatus 110 increases when the orientation direction of the liquid crystal (the third direction D3) matches the polarizing axis P1. In the case where the angle (the second angle $\theta 2$) between the polarizing axis P1 and the orientation direction of the liquid crystal (the third direction D3) excessively increases, the refractive index difference decreases; and the refractive power of the lens decreases. Therefore, in this embodiment, the angle (the second angle $\theta 2$) between the polarizing axis P1 and the orientation direction of the liquid crystal (the third direction D3) is set to be less than the first angle $\theta 1$. Thereby, the decrease of the refractive power of the lens is suppressed while suppressing the occurrence of the reverse twist.

The first direction D1 is tilted with respect to the polarizing axis P1 to suppress the moiré that occurs in the image display unit 120 and the liquid crystal optical apparatus 110. The angle between the first direction D1 and the polarizing axis P1 is set to suppress the moiré based on the angle between the polarizing axis P1 and the arrangement direction of the pixel groups 50 of the image display unit 120, the disposition pitch of the pixel groups 50 of the image display unit 120, the number of the parallax images of the image display unit 120, the disposition pitch of the first electrodes 21 of the liquid crystal optical apparatus 110, etc.

For example, in the display liquid crystal layer 123, there are cases where the arrangement direction of the pixel groups 50 of the image display unit 120 is set to be substantially perpendicular or substantially parallel to the polarizing axis P1 (e.g., in the case where the VA mode is employed in the display liquid crystal layer 123, etc.). In such a case, for example, the angle between the first direction D1 and the polarizing axis P1 is not less than 45 degrees and not more than 85 degrees. In such a case, the moiré is not perceived easily. In such a case, the angle (the first angle $\theta 1$) between the second direction D2 and the polarizing axis P1 is not less than 5 degrees not more than 45 degrees.

Thus, in the case where the angle (a fourth angle $\theta 4$) between the polarizing axis P1 and the arrangement direction of the pixel groups 50 provided in the display liquid crystal layer 123 is not less than 0 degrees and not more than 5 degrees or not less than 85 degrees and not more than 90 degrees, the first angle $\theta 1$ is set to be not less than 5 degrees and not more than 45 degrees. In such a case, the first angle $\theta 1$ may be set to be not less than 5 degrees and not more than 30 degrees.

For example, in the display liquid crystal layer 123, there are cases where the arrangement direction of the pixel groups is set to be substantially 45 degrees (±45 degrees) from the polarizing axis P1 (e.g., in the case where the TN mode is employed as the display liquid crystal layer 123, etc.). In such a case, the angle between the first direction D1 and the polarizing axis P1 is, for example, not less than 5 degrees and not more than 40 degrees. In such a case, the moiré is not perceived easily. In such a case, the first angle θ1 is not less than 50 degrees and not more than 85 degrees.

Thus, in the case where the fourth angle θ4 is not less than 40 degrees and not more than 50 degrees, the first angle θ1 is set to be not less than 50 degrees and not more than 85 degrees. In such a case, the first angle θ1 may be set to be not less than 60 degrees and not more than 85 degrees.

For example, the angle (the third angle θ3) between the second direction D2 and the third direction D3 is not less than 2 degrees. Considering the fluctuation of the process of providing the orientation in the manufacturing of the liquid crystal optical apparatus, etc., the suppression of the disclinations can be reliable by the third angle θ3 being not less than 2 degrees. For example, the third angle θ3 is not more than 45 degrees. In the case where the third angle θ3 is greater than 45 degrees, for example, the component of the electric field applied to the liquid crystal in the direction along the Y2 axis increases; and the desired alignment is not obtained easily.

The portion of the liquid crystal layer 30 opposing the first electrode 21 corresponds to the end of the gradient index lens. As recited above, the electric field at the lens end is strong; and the alignment of the liquid crystal easily becomes disordered. Alignment disorder also occurs in the X2-Y2 plane. The orientation direction of the liquid crystal (the third direction D3) is tilted with respect to the second direction D2; and the angle between the polarizing axis P1 and the orientation direction (the third direction D3) is reduced. For example, a high lens effect can be obtained while suppressing the disorder of the alignment by setting the orientation direction of the liquid crystal (the third direction D3) to be inside the smaller angle that is formed between the second direction D2 and the polarizing axis P1. According to this embodiment, an image display device having good optical characteristics can be provided.

Figure 4:
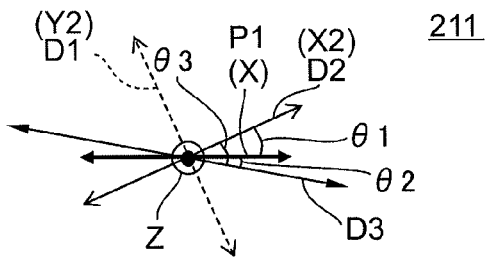
FIG. 4 is a schematic view illustrating the configuration of another image display device according to the first embodiment.

FIG. 4 is a schematic view illustrating the configuration of another image display device according to the first embodiment.

FIG. 4 is a schematic view illustrating the optical axes of the image display device 211.

As illustrated in FIG. 4, the image display device 211 includes the liquid crystal optical apparatus 110 and the image display unit 120. Other than the relationship between the axes illustrated in FIG. 4, the configurations of the liquid crystal optical apparatus 110 and the image display unit 120 are similar to those of the image display device 211, and a description is therefore omitted. The axes of the image display device 211 will now be described.

As illustrated in FIG. 4, in the image display device 211 as well, the angle between the polarizing axis P1 and the first direction D1 is greater than 0 degrees and less than 90 degrees. In other words, the first direction D1 is tilted with respect to the polarizing axis P1. Accordingly, the angle (the first angle θ1) between the polarizing axis P1 and the second direction D2 is greater than 0 degrees and less than 90 degrees. The angle (the second angle θ2) between the polarizing axis P1 and the third direction D3 which is the long-axis direction of the liquid crystal molecules of the liquid crystal layer 30 projected onto the first major surface 11a is greater than 0 degrees and less than the angle between the polarizing axis P1 and the second direction D2. In such a case, the angle (the third angle θ3) between the third direction D3 and the second direction D2 is greater than the angle (the first angle) between the polarizing axis P1 and the second direction D2. In such a case as well, the decrease of the lens effect can be suppressed while suppressing the occurrence of the reverse twist. Thereby, an image display device having good optical characteristics is provided.

Second Embodiment

Figure 5:
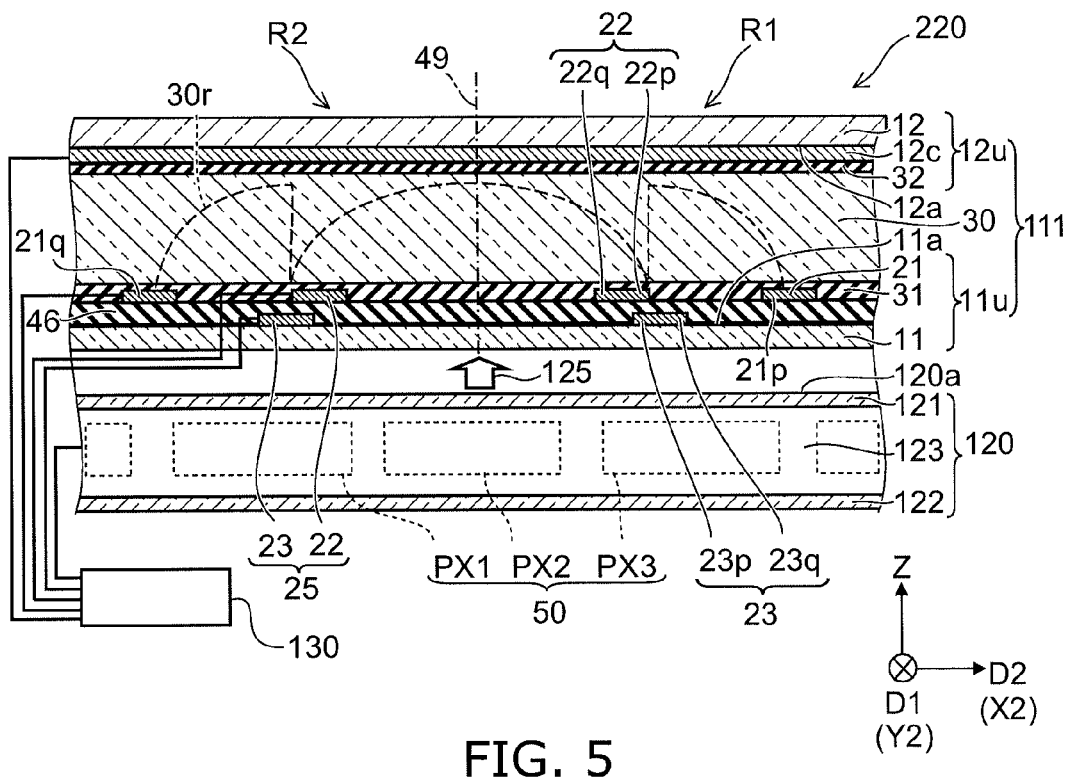
FIG. 5 is a schematic cross-sectional view illustrating the configuration of an image display device according to a second embodiment.

FIG. 5 is a schematic cross-sectional view illustrating the configuration of an image display device according to a second embodiment.

As illustrated in FIG. 5, the image display device 220 includes a liquid crystal optical apparatus 111 and the image display unit 120. The configuration of the image display unit 120 may be similar to the configuration described in regard to the first embodiment. The portions of the liquid crystal optical apparatus 111 that differ from those of the liquid crystal optical apparatus 110 will now be described.

In the liquid crystal optical apparatus 111, the first substrate unit 11u further includes multiple electrode pairs 25 in addition to the multiple first electrodes 21. The multiple electrode pairs 25 are provided in the regions between the multiple first electrodes 21 on the first major surface 11a. The multiple electrode pairs 25 are arranged in the second direction D2 (the X2-axis direction).

Each of the multiple electrode pairs 25 includes a second electrode 22 and a third electrode 23. The second electrode 22 extends in the Y2-axis direction (the first direction D1). The third electrode 23 extends in the Y2-axis direction. In the liquid crystal optical apparatus 111, an insulating layer 46 is provided between the second electrode 22 and the third electrode 23. The insulating layer 46 also is provided between the first substrate 11 and the first electrodes 21. For example, the insulating layer 46 is provided on the first substrate 11 to cover the third electrode 23 and the first major surface 11a. For example, the multiple first electrodes 21 and the multiple second electrodes 22 are provided on the insulating layer 46. The insulating layer 46 may be continuous between the multiple electrode pairs 25. In this example, the insulating layer 46 extends between the first electrodes 21 and the first substrate 11.

Two of the multiple first electrodes 21 are illustrated in FIG. 5. The number of the multiple first electrodes 21 is arbitrary.

Two most proximal first electrodes 21 of the multiple first electrodes 21 will now be focused upon. A central axis 49 is between the most proximal first electrodes 21. The central axis 49 passes through the midpoint of a line segment connecting the X-axis direction centers of the two most proximal first electrodes 21. The central axis 49 is parallel to the Y2-axis direction.

An electrode 21p which is one of the two most proximal first electrodes 21 will now be focused upon. The position of the electrode 21p is the position of the X2 axis-direction center of the first electrode 21.

The region of the first major surface 11a between the central axis 49 and the electrode 21p which is the one of the two most proximal first electrodes 21 is taken as a first region R1. The region of the first major surface 11a between the central axis 49 and an electrode 21q which is the other of the two most proximal first electrodes 21 is taken as a second region R2. The direction from the central axis 49 toward the electrode 21p is taken as the +X2 direction. The direction from the central axis 49 toward the electrode 21q corresponds to the −X2 direction.

In this example, one electrode pair 25 is provided in the first region R1. Also, one electrode pair 25 is provided in the second region R2. The multiple electrode pairs 25 are separated from each other when projected onto the X2-Y2 plane. A region where electrodes are not provided exists between the electrode pairs 25. In the embodiment, other electrodes may be further provided between the electrode pairs 25.

In one electrode pair 25, the second electrode 22 includes a first superimposed portion 22p overlaying the third electrode 23 and a first non-superimposed portion 22q not overlaying the third electrode 23 when projected onto a plane (the X2-Y2 plane) parallel to the Y2-axis direction and the X2-axis direction. In the one electrode pair 25, the third electrode 23 includes a second superimposed portion 23p overlaying the second electrode 22 and a second non-superimposed portion 23q not overlaying the second electrode 22 when projected onto the X2-Y2 plane.

In the electrode pair 25 included in the first region R1 of the liquid crystal optical apparatus 111, the first superimposed portion 22p is disposed between the second superimposed portion 23p and the liquid crystal layer 30. The position of the second electrode 22 is shifted in the X2-axis direction from the position of the third electrode 23. Specifically, in one electrode pair 25, the distance between the second non-superimposed portion 23q and the central axis 49 is longer than the distance between the first non-superimposed portion 22q and the central axis 49. In other words, in the one electrode pair 25, the second electrode 22 is more proximal to the central axis 49 than is the third electrode 23.

The disposition of the electrode pair 25 in the second region R2 has substantially line symmetry with the central axis 49 as an axis of symmetry. However, the line symmetry may not be rigorous. For example, a micro asymmetry may be introduced based on the distribution (e.g., the pretilt angle, etc.) of the arrangement of the liquid crystal layer 30.

In the case where the liquid crystal optical apparatus 111 is switched from the first state to the second state, the drive unit 130 applies, for example, a first voltage between the first electrodes 21 and the opposing electrode 12c, a second voltage between the second electrodes 22 and the opposing electrode 12c, and a third voltage between the third electrodes 23 and the opposing electrode 12c. For convenience herein, even in the case where the potential difference between the electrodes is zero, this is described as a voltage (a voltage of 0 volts) being applied. The absolute value of the first voltage is greater than the absolute value of the third voltage. The absolute value of the second voltage is greater than the absolute value of the third voltage. In the case where these voltages are alternating currents, the effective value of the first voltage is greater than the effective value of the third voltage. The effective value of the second voltage is greater than the effective value of the third voltage. For example, the effective value of the first voltage may be set to be greater than the effective value of the third voltage. The absolute value of the first voltage is greater than the absolute value of the second voltage.

When the voltage is applied as recited above, the alignment of the liquid crystal molecules 35 that was the horizontal alignment approaches the vertical alignment in the portion of the liquid crystal layer 30 where the first electrode 21 opposes the opposing electrode 12c. The liquid crystal molecules 35 remain in the horizontal alignment in the portion of the liquid crystal layer 30 proximal to the center of the two adjacent first electrodes 21. The alignment of the liquid crystal molecules 35 that was the horizontal alignment approaches the vertical alignment in the portion of the liquid crystal layer 30 where the opposing electrode 12c opposes the second electrode 22. The liquid crystal molecules 35 remain in the horizontal alignment in the portion of the liquid crystal layer 30 where the opposing electrode 12c opposes the second non-superimposed portion 23q of the third electrode 23.

The refractive index gradually increases from the first electrode 21 toward the third electrode 23 in the portion between the first electrode 21 and the third electrode 23. The refractive index abruptly decreases from the third electrode 23 toward the second electrode 22 proximal to the boundary between the second non-superimposed portion 23q and the first superimposed portion 22p. The refractive index gradually increases from the second electrode 22 toward the central axis 49 in the portion between the second electrode 22 and the central axis 49. Accordingly, when the voltage is applied as recited above, the liquid crystal layer 30 has a refractive index distribution having a Fresnel lens-like configuration in which the refractive index has a jump at the portion where the opposing electrode 12c opposes the electrode pair 25.

For the liquid crystal optical apparatus 111 in which the refractive index distribution having the Fresnel lens-like configuration is formed in the liquid crystal layer 30, the thickness of the liquid crystal layer 30 can be thinner than that of the liquid crystal optical apparatus 110. The response rate of the liquid crystal layer 30 when switching between the first state and the second state can be increased.

In the image display device 210 as well, the angle between the polarizing axis P1 and the first direction D1 is greater than 0 degrees and less than 90 degrees. The angle (the first angle $\theta 1$) between the polarizing axis P1 and the second direction D2 is greater than 0 degrees and less than 90 degrees. The angle (the second angle $\theta 2$) between the polarizing axis P1 and the third direction D3 which is the long-axis direction of the liquid crystal molecules of the liquid crystal layer 30 projected onto the first major surface 11a is greater than 0 degrees and less than the angle between the polarizing axis P1 and the second direction D2. In such a case, the angle (the third angle $\theta 3$) between the third direction D3 and the second direction D2 is greater than the angle (the first angle $\theta 1$) between the polarizing axis P1 and the second direction D2. In such a case as well, the decrease of the lens effect can be suppressed while suppressing the occurrence of the reverse twist. Thereby, an image display device having good optical characteristics is provided. In the image display device 210, the third angle $\theta 3$ may be less than the first angle $\theta 1$.

According to the embodiments, an image display device having good optical characteristics is provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in liquid crystal optical apparatuses and image display devices such as first substrate units, second substrate units, liquid crystal layers, first substrates, first electrodes, second substrates, opposing electrodes, second electrodes, third electrodes, image display units, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all image displays practicable by an appropriate design modification by one skilled in the art based on the image displays described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image display device, comprising:
    an image display unit having a display surface, the image display unit being configured to emit image light, the image light being polarized light having a polarizing axis parallel to the display surface; and
    a liquid crystal optical apparatus stacked with the display surface, the liquid crystal optical apparatus including:
        a first substrate unit including
            a first substrate having a first major surface parallel to the display surface, and
            a plurality of first electrodes provided on the first major surface to extend along a first direction, the first electrodes being arranged in a direction non-parallel to the first direction, an angle between the polarizing axis and a second direction parallel to the first major surface and perpendicular to the first direction being greater than 0 degrees and less than 90 degrees;
        a second substrate unit including
            a second substrate having a second major surface opposing the first major surface, and
            an opposing electrode provided on the second major surface to oppose the first electrodes; and
        a liquid crystal layer provided between the first substrate unit and the second substrate unit, the liquid crystal layer including liquid crystal molecules, an angle between a third direction and the polarizing axis being greater than 0 degrees and less than the angle between the polarizing axis and the second direction, the third direction being a long-axis direction of the liquid crystal molecules projected onto the first major surface.

2. The device according to claim 1, wherein an angle between the third direction and the second direction is less than the angle between the polarizing axis and the second direction.

3. The device according to claim 1, wherein the angle between the third direction and the second direction is not less than 2 degrees and not more than 45 degrees.

4. The device according to claim 1, wherein the angle between the polarizing axis and the first direction is not less than 45 degrees and not more than 85 degrees.

5. The device according to claim 1, further comprising a drive unit configured to apply a voltage between the first electrode and the opposing electrode to change the distribution of the refractive index of the liquid crystal layer.

6. The device according to claim 1, wherein the image display unit includes a polarizing layer having a transmission axis, the polarizing axis is parallel to the transmission axis.

7. The device according to claim 1, wherein the third direction is positioned inside the angle between the polarizing axis and the second direction.

8. The device according to claim 1, wherein a dielectric anisotropy of the liquid crystal layer is positive, a pretilt angle in the liquid crystal layer is not less than 0 degrees and not more than 30 degrees.

9. The device according to claim 8, wherein an alignment of the liquid crystal layer is a horizontal alignment.

10. The device according to claim 1, wherein a dielectric anisotropy of the liquid crystal layer is negative, a pretilt angle in the liquid crystal layer is not less than 60 degrees and not more than 90 degrees.

11. The device according to claim 10, wherein an alignment of the liquid crystal layer is a vertical alignment or a hybrid aligned nematic alignment.

12. The device according to claim 1, wherein the first electrodes and the opposing electrode include an oxide including at least one element selected from the group consisting of In, Sn, Zn, and Ti.

13. The device according to claim 1, wherein
    the first substrate unit includes a first alignment film provided between the first electrode and the liquid crystal layer,
    the second substrate unit includes a second alignment film provided between the opposing electrode and the liquid crystal layer.

14. The device according to claim 1, wherein
    the image display unit includes a plurality of pixel groups,
    an angle between the polarizing axis and an arrangement direction of the pixel groups is not less than 0 degrees and not more than 5 degrees or not less than 85 degrees and not more than 90 degrees,
    an angle between the polarizing axis and the second direction is not less than 5 degrees and not more than 45 degrees.

15. The device according to claim 1, wherein
    the image display unit includes a plurality of pixel groups,
    an angle between the polarizing axis and an arrangement direction of the pixel groups is not less than 40 degrees and not more than 45 degrees,
    the angle between the polarizing axis and the second direction is not less than 50 degrees and not more than 85 degrees.

16. The device according to claim 1, wherein
    the first substrate unit further includes a plurality electrode pairs provided on the first major surface, each electrode pair includes:
    a second electrode:
    a third electrode; and
    an insulating layer provided between the second electrode and the third electrode,
    the second electrode includes a first superimposed portion overlaying the third electrode and a first non-superimposed portion not overlaying the third electrode when projected onto a plane parallel to the first major surface,
    the third electrode includes a second superimposed portion overlaying the second electrode and a second non-superimposed portion not overlaying the second electrode when projected onto the plane parallel to the first major surface.

17. The device according to claim 16, further comprising a drive unit configured
    to apply a first voltage between the first electrode and the opposing electrode,
    to apply a second voltage between the second electrode and the opposing electrode, and to apply a third voltage between the third electrode and the opposing electrode, an absolute value of the first voltage being greater than an absolute value of the second voltage and greater than an absolute value of the third voltage.

18. The device according to claim 17, wherein the absolute value of the second voltage is greater than the absolute value of the third voltage.

19. The device according to claim 16, wherein one of the electrode pairs is provided in a first region between a central axis and one of two most proximal first electrodes, the central axis passing through a midpoint of a line segment connecting a center of the one of the two most proximal first electrodes and a center of other of the two most proximal first electrodes, the central axis being parallel to the second direction other one of the electrode pairs is provided in a second region between the central axis and the other of the two most proximal first electrodes.

20. The device according to claim 19, wherein in the one of the electrode pairs, a distance between the second non-superimposed portion and the central axis is longer than a distance between the first non-superimposed portion and the central axis.

* * * * *